United States Patent
Su et al.

(10) Patent No.: US 10,402,288 B2
(45) Date of Patent: Sep. 3, 2019

(54) USB-TESTING METHOD AND TESTING FIXTURE BOARD FOR USB DEVICE

(71) Applicant: Getac Technology Corporation, Hsinchu County (TW)

(72) Inventors: Huang-Wen Su, Taipei (TW); Shi-Tsan Lin, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 141 days.

(21) Appl. No.: 15/782,181

(22) Filed: Oct. 12, 2017

(65) Prior Publication Data

US 2019/0114242 A1 Apr. 18, 2019

(51) Int. Cl.
| | |
|---|---|
| *G06F 11/00* | (2006.01) |
| *G06F 11/22* | (2006.01) |
| *G06F 11/263* | (2006.01) |
| *G06F 13/42* | (2006.01) |
| *G06F 11/273* | (2006.01) |
| *G06F 11/26* | (2006.01) |

(52) U.S. Cl.
CPC ........... *G06F 11/221* (2013.01); *G06F 11/26* (2013.01); *G06F 11/263* (2013.01); *G06F 11/273* (2013.01); *G06F 11/2733* (2013.01); *G06F 13/4282* (2013.01); *G06F 2213/0042* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,829,726 | B1* | 12/2004 | Korhonen | G06F 11/273 710/5 |
| 2005/0097403 | A1* | 5/2005 | Chen | G06F 11/221 714/43 |
| 2005/0268175 | A1* | 12/2005 | Park | G06F 11/006 714/43 |
| 2008/0082286 | A1* | 4/2008 | Nagano | G06F 11/221 702/120 |
| 2009/0055560 | A1* | 2/2009 | Kanai | G06F 11/221 710/63 |
| 2011/0126057 | A1* | 5/2011 | Chang | G06F 11/221 714/43 |
| 2013/0139005 | A1* | 5/2013 | Zhang | G06F 11/221 714/43 |

* cited by examiner

*Primary Examiner* — Charles Ehne
(74) *Attorney, Agent, or Firm* — Tim Tingkang Xia, Esq.; Locke Lord LLP (57) ABSTRACT

A universal serial bus (USB) testing method includes selecting a selected test mode from test modes, creating a USB communication link between a USB device and a testing fixture board, generating, by the testing fixture board, a test-triggering instruction corresponding to the selected test mode according to the selected test mode, sending the test-triggering instruction to the USB device with the USB communication link, generating, by the USB device, a testing packet corresponding to the selected test mode according to the test-triggering instruction, and outputting the testing packet repeatedly from at least one external port of the USB device.

14 Claims, 9 Drawing Sheets

USB-TESTING METHOD AND TESTING FIXTURE BOARD FOR USB DEVICE

BACKGROUND OF THE INVENTION

Field of the Invention

The present invention relates to technology of testing input/output interfaces which comply with USB 3.0 standard and, more particularly, to a universal serial bus (USB) testing method and a testing fixture board for a USB device.

Description of the Prior Art

Universal serial bus (USB) interface is the input/output interface most widely used. A USB device, such as a mouse, keyboard, printer, hard disk drive, USB flash drive, camera, cellular phone, tablet, laptop, personal computer, set-top box, or game console, can be linked to another USB device by the USB interface in order to exchange data.

To test and determine whether USB interfaces of USB devices function well, USB device delivery inspection requires a testing worker to conduct a quality test on the USB interfaces. Regarding the physical layer testing specifications of USB 2.0, USB Implementers Forum (USB IF) sets forth three testing specifications for low speed, full speed, and high speed, respectively. The USB High-Speed Electrical Test Tool provided by the USB IF controls how a USB device under test sends specific testing packets when operated by a conventional operating system, and the testing packets are observed with an oscilloscope to confirm the compatibility and signal quality of the USB interface of the USB device which meets USB 2.0 standard.

Unlike USB 2.0 standard, USB 3.0 standard features greatly simplified testing specifications and testing techniques. USB 3.0 interface chips of USB devices operated by a conventional operating system are preconfigured with a test mode. In the situation where connecting a USB device under test to a testing fixture board is not followed by any response for a while, a USB interface chip mounted on the USB device under test enters a compatibility mode directly. In the compatibility mode, the USB device under test starts sending testing packets so that an oscilloscope measures the testing packets through the testing fixture board and displays the measured testing packets, allowing a testing worker to confirm and support the compatibility and signal quality of the USB interface of the USB device under test.

However, testing techniques applicable to USB 3.0 interfaces are useless to a USB device with a USB 3.0 interface, if the USB device is an embedded system.

SUMMARY OF THE INVENTION

In an embodiment, a universal serial bus (USB) testing method comprises the steps of: selecting a selected test mode from a plurality of test modes; creating a USB communication link between a USB device and a testing fixture board; generating, by the testing fixture board, a test-triggering instruction corresponding to the selected test mode according to the selected test mode; sending the test-triggering instruction to the USB device with the USB communication link; generating, by the USB device, a testing packet corresponding to the selected test mode according to the test-triggering instruction; and outputting the testing packet repeatedly from at least one external port of the USB device.

In an embodiment, a testing fixture board for a USB device comprises a substrate, a storage unit, a USB port, a user interface and a control unit. The storage unit, USB port, user interface and control unit are disposed on the substrate. The control unit is coupled to the storage unit, USB port and user interface. The storage unit stores a list of a selection signal and a test-triggering instruction for each of a plurality of test modes. The user interface generates a selection signal indicative of a selected test mode among the plurality of test modes. The control unit generates the test-triggering instruction corresponding to the selected test mode according to the selection signal and the list and sends the test-triggering instruction from the USB port.

In conclusion, a USB testing method and a testing fixture board for a USB device provided according to the present invention are applicable to a USB device operated by an embedded operating system with a view to triggering the USB device to test a USB interface thereof, thereby testing the compatibility and signal quality of the USB interface easily.

DETAILED DESCRIPTION OF THE EMBODIMENTS

Figure 1:
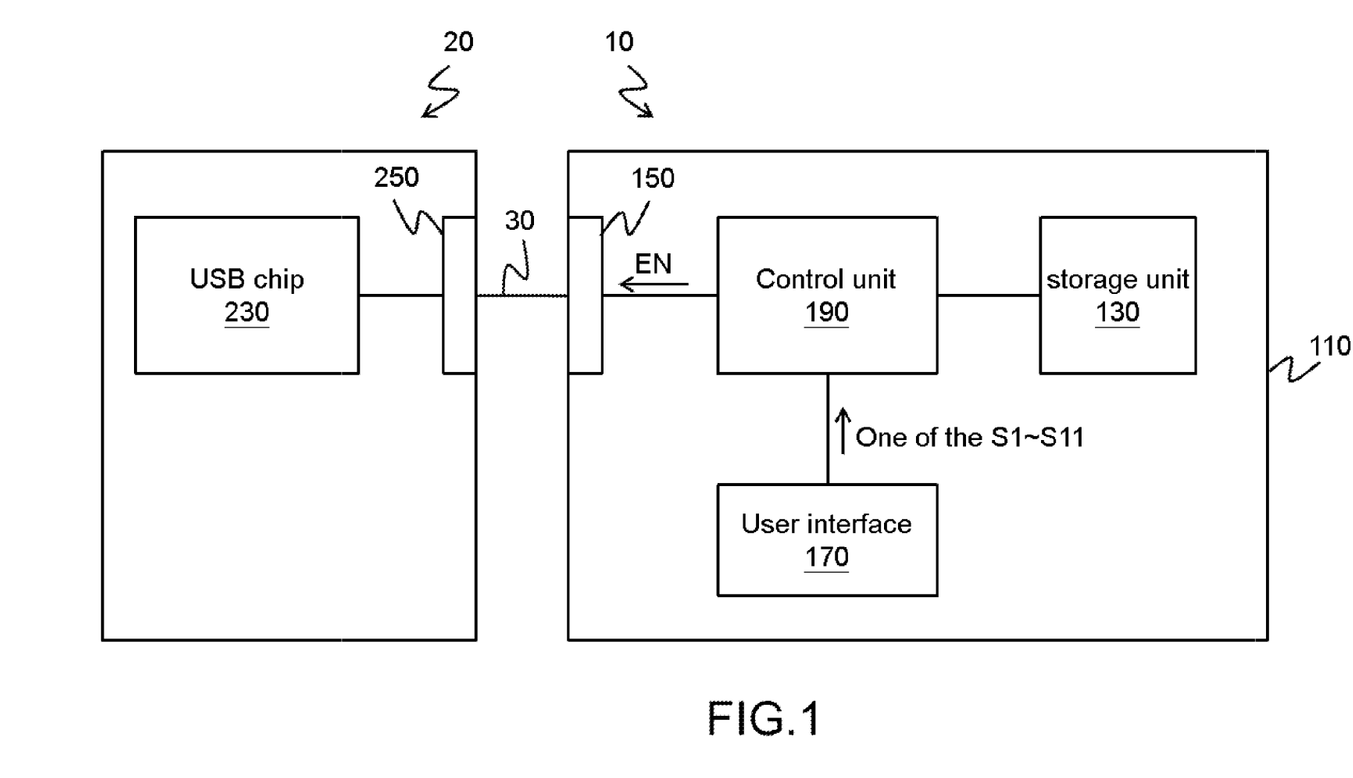
FIG. 1 is a schematic block diagram of a testing fixture board for a universal serial bus (USB) device according to an embodiment of the present invention.

FIG. 1 is a schematic block diagram of a testing fixture board for a universal serial bus (USB) device according to an embodiment of the present invention. Referring to FIG. 1, a testing fixture board 10 for a USB device (hereinafter referred to as the testing fixture board 10) comprises a substrate 110, a storage unit 130, a USB port 150, a user interface 170 and a control unit 190. The storage unit 130, USB port 150, user interface 170 and control unit 190 are disposed on the substrate 110. The control unit 190 is coupled to the storage unit 130, USB port 150 and user interface 170. The storage unit 130 stores a list which shows a selection signal and a test-triggering instruction EN for each of a plurality of test modes, as shown in Table 1. In an embodiment, each test-triggering instruction EN is an identifier. The identifier is, for example, a vendor ID (VID) and/or a product ID (PID).

TABLE 1

List

| Test Mode | Test-triggering Instruction | Selection Signal |
|---|---|---|
| Test_SE0_NAK | 0x0101 | S1 |
| Test_J | 0x0102 | S2 |
| Test_K | 0x0103 | S3 |
| Test_Packet | 0x0104 | S4 |
| RESERCED | 0x0105 | S5 |
| HS_HOST_PORT_SUSPEND_RESUME | 0x0106 | S6 |
| SINGLE_STEP_GET_DEV_DESC | 0x0107 | S7 |
| SINGLE_STEP_SET_FEATURE | 0x0108 | S8 |
| TTST_CONFIG | 0x0200 | S9 |
| Unknown Device Not Supporting HNP | 0x0201 | S10 |
| Unknown Device Supporting HNP | 0x0202 | S11 |

The description below is exemplified by one USB port 150, but the present invention is not limited thereto. In a variant embodiment, the testing fixture board 10 comprises a plurality of USB ports 150.

Figure 2:
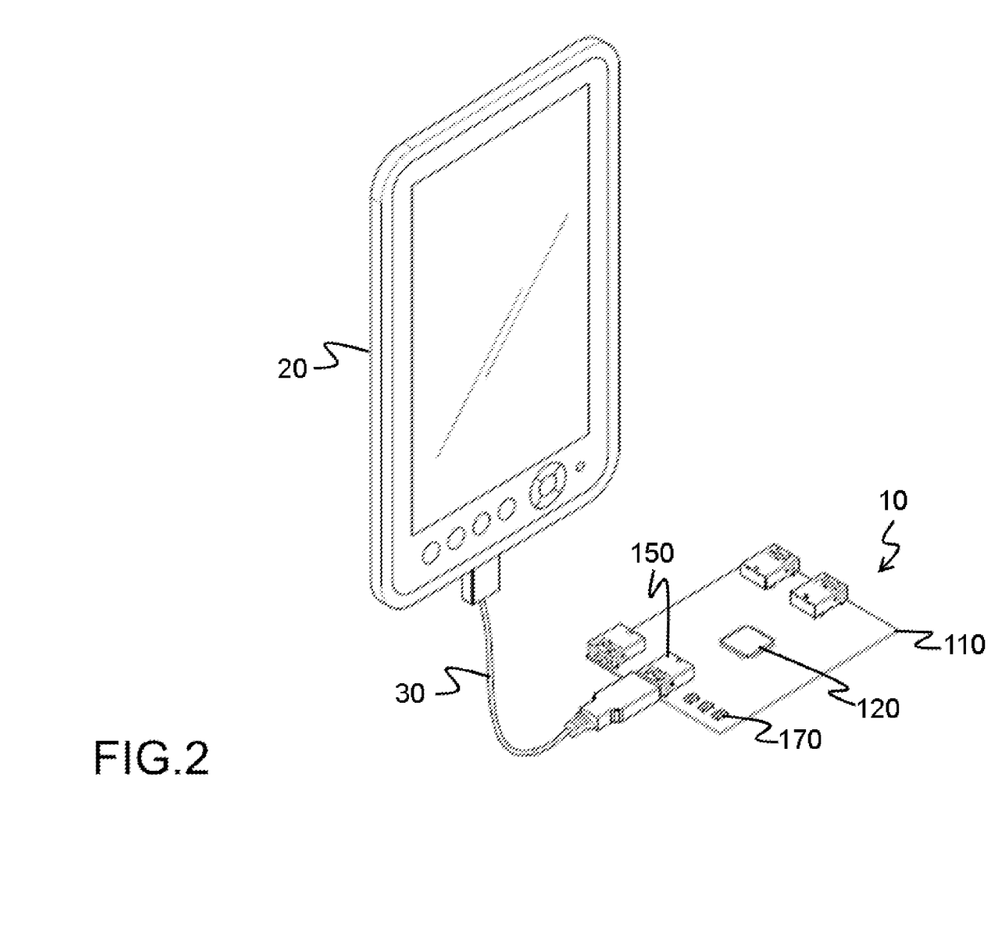
FIG. 2 is a schematic view of application of the testing fixture board in FIG. 1.
Figure 3:
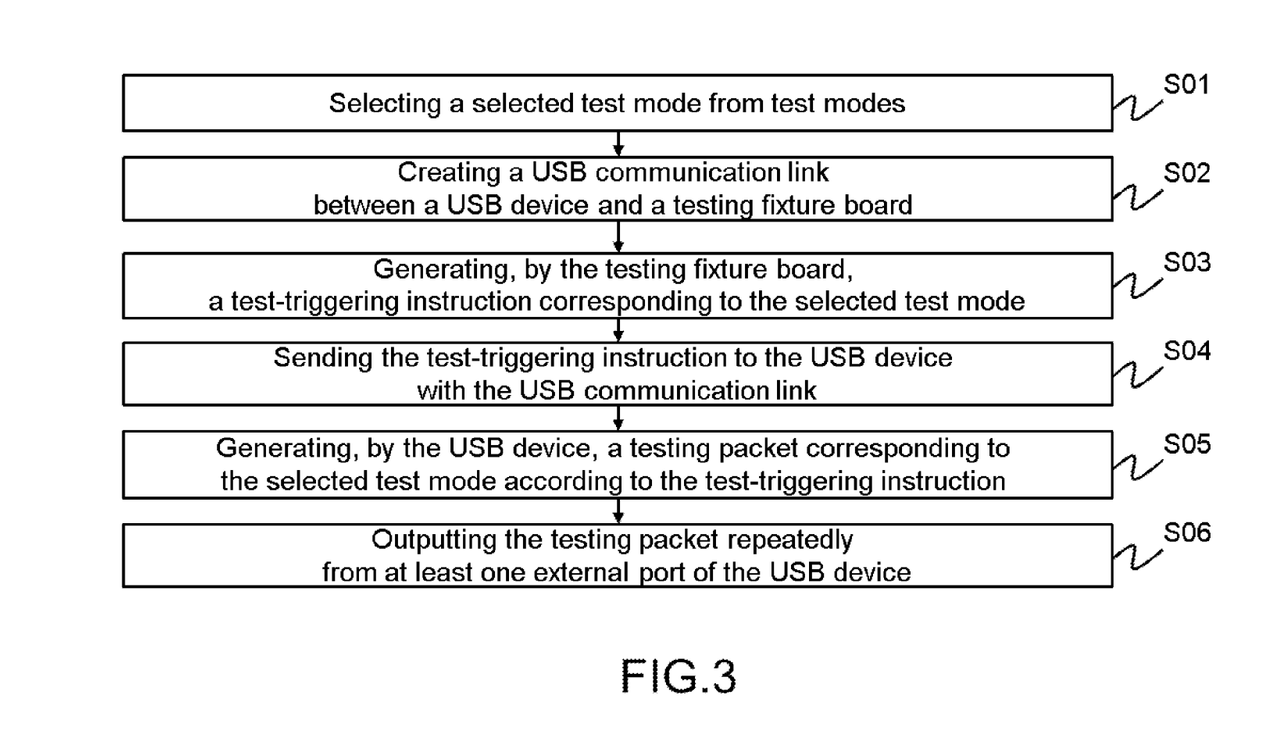
FIG. 3 is a flowchart of a USB testing method according to an embodiment of the present invention.

FIG. 2 is a schematic view of application of the testing fixture board in FIG. 1. FIG. 3 is a flowchart of a USB testing method according to an embodiment of the present invention. Referring to FIG. 1, FIG. 2 and FIG. 3, to test a USB interface of a USB device 20, a user selects one (hereinafter referred to as the selected test mode) of a plurality of test modes by controlling the user interface 170 so that the user interface 170 generates a selection signal (one of S1~S11) indicative of the selected test mode according to the user's input (step S01). Then, the user uses a connection line 30 to connect the USB port 150 of the testing fixture board 10 to an external port 250 of the USB device 20 to be tested, so as to create a USB communication link between the USB device 20 and the testing fixture board 10 (step S02). The control unit 190 receives the selection signal from the user interface 170 and generates the test-triggering instruction EN corresponding to the selected test mode according to the selection signal and the list (step S03). The USB device 20 is an embedded device and is operated by an embedded operating system.

For example, given the list shown in Table 1, if the selected test mode selected by the user is "Test_J," the user interface 170 generates selection signal S2 according to the user's input. The control unit 190 reads from the list of the storage unit 130 the test-triggering instruction EN "0x0102" corresponding to selection signal S2 according to selection signal S2.

The control unit 190 sends the test-triggering instruction EN to the USB device 20 with the USB communication link (step S04). Specifically speaking, the control unit 190 sends the test-triggering instruction EN from the USB port 150 to the USB device 20 with the connection line 30 via the external port 250.

After receiving the test-triggering instruction EN, the USB device 20 generates a testing packet corresponding to the selected test mode according to the received test-triggering instruction EN (step S05). Afterward, the testing packet is repeatedly outputted from an external port (such as the external port 250 for use in creating the USB communication link or any other applicable external port) of the USB device 20 (step S06). For example, the USB device 20 comprises a USB chip 230. The USB chip 230 is coupled to the external port 250 and adapted to control data transmission of the external port 250. After receiving the test-triggering instruction EN with the external port 250, the USB chip 230 reads a related testing packet from a built-in storage unit according to the received test-triggering instruction EN and outputs the testing packet repeatedly from the external port 250, thereby allowing USB testing to be carried out in the selected test mode.

Figure 4:
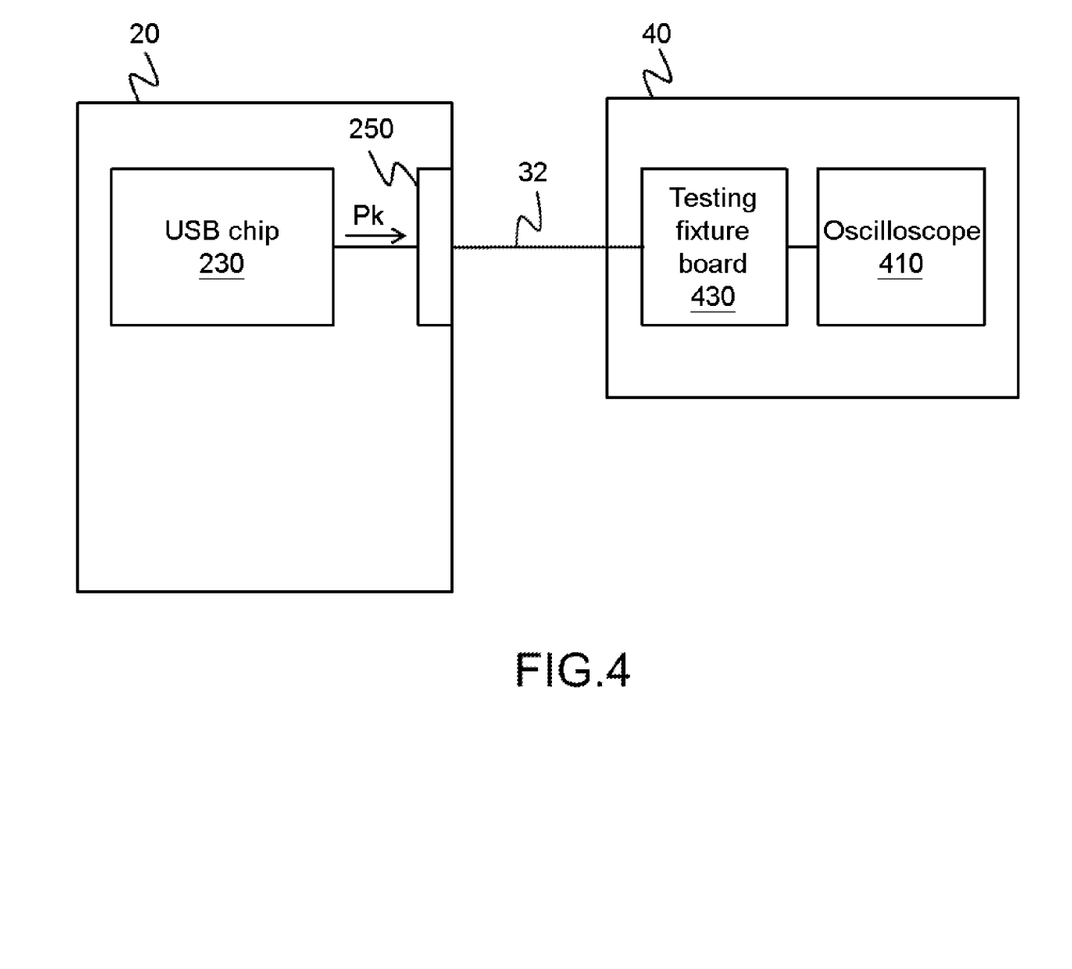
FIG. 4 is a schematic block diagram of a measuring device for the USB device according to an embodiment of the present invention.
Figure 5:
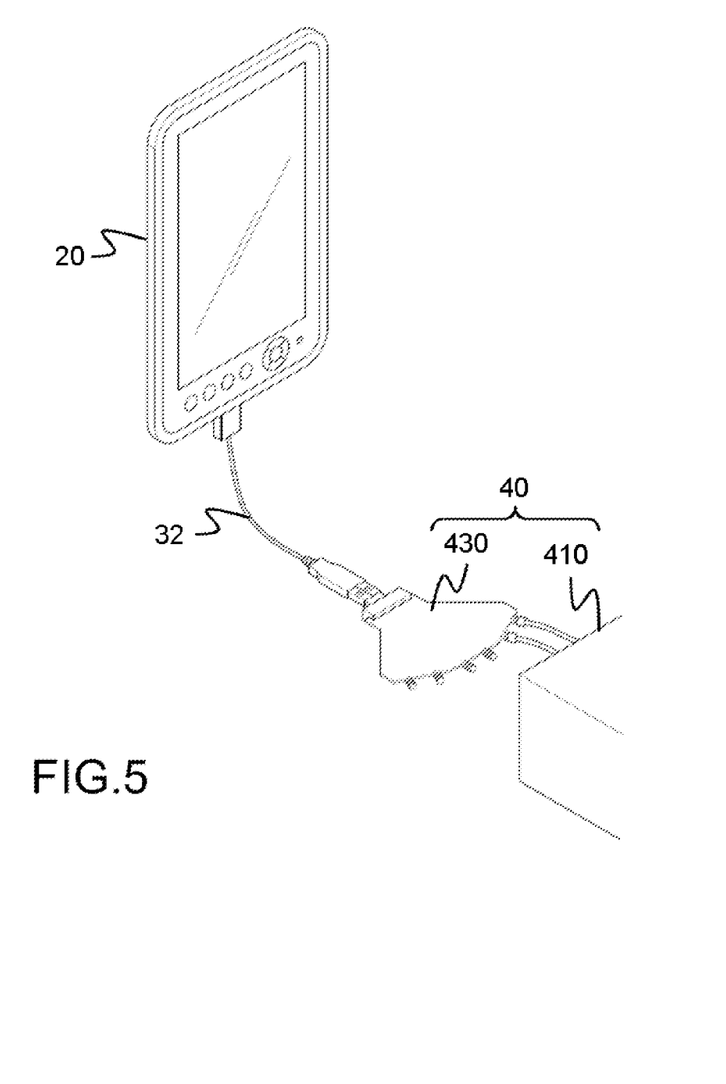
FIG. 5 is a schematic view of application of the measuring device in FIG. 4.

FIG. 4 is a schematic block diagram of a measuring device for the USB device according to an embodiment of the present invention. FIG. 5 is a schematic view of application of the measuring device in FIG. 4. Referring to FIG. 4 and FIG. 5, in an embodiment, after the USB device 20 started outputting the testing packet Pk repeatedly (step S06), the user measures the testing packet Pk outputted from the USB device 20 with a measuring device 40 and confirms the result of the USB testing of the selected test mode in accordance with a measurement result of the measuring device 40. For example, after the USB device 20 started outputting the testing packet Pk repeatedly (step S06), the user severs the USB communication link between the USB device 20 and the testing fixture board 10 and connects the measuring device 40 to the external port 250 of the USB device 20 with a connection line 32, so as to create a communication link between the measuring device 40 and the USB device 20. Afterward, the measuring device 40 starts measuring the testing packet Pk outputted from the USB device 20.

In an embodiment, the USB chip 230 of the USB device 20 is coupled to the external port 250, as shown in FIG. 1. The testing fixture board 10 and the measuring device 40 are each connected to the USB device 20 by the communication link via the external port 250.

Figure 6:
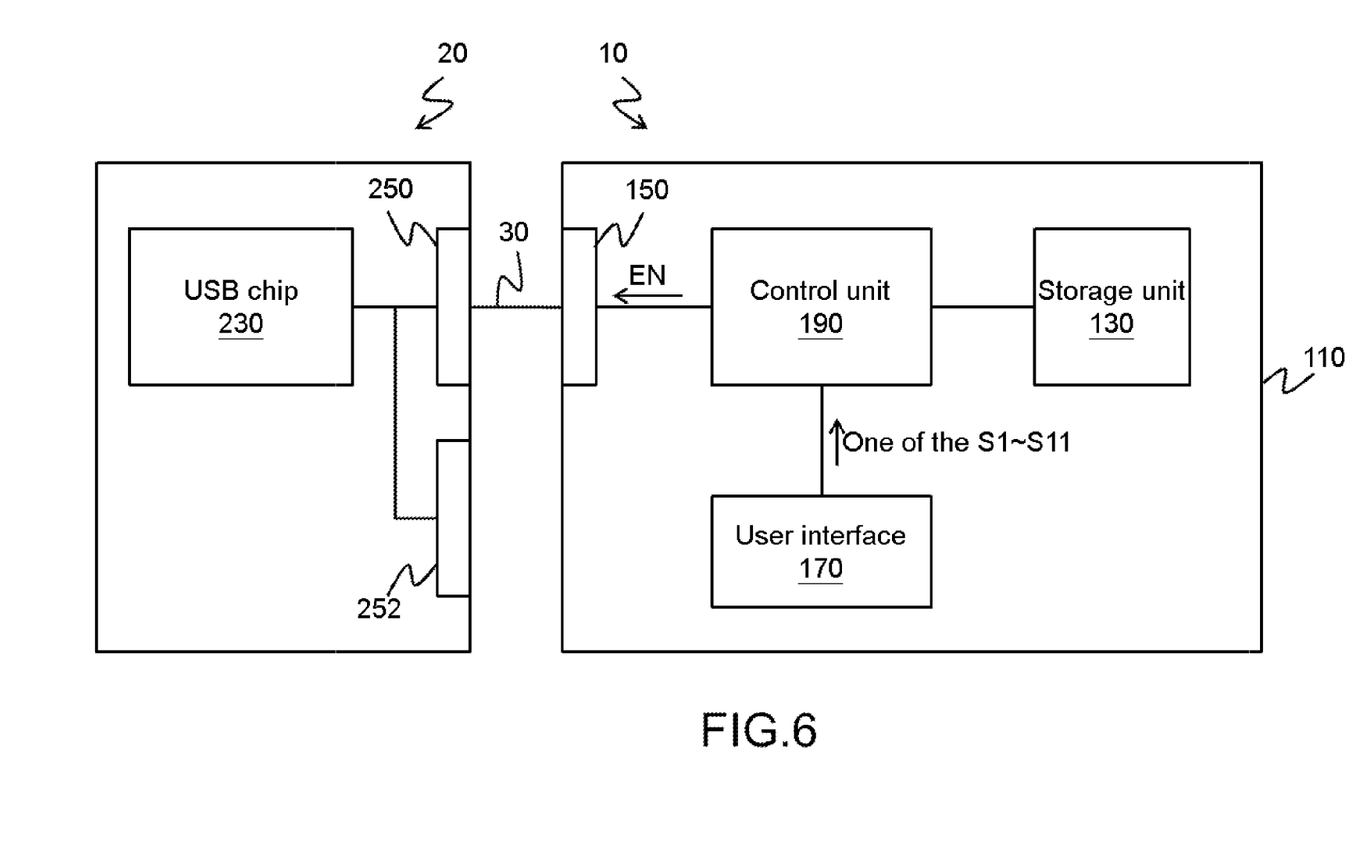
FIG. 6 is a schematic block diagram of another testing fixture board according to another embodiment of the present invention.
Figure 7:
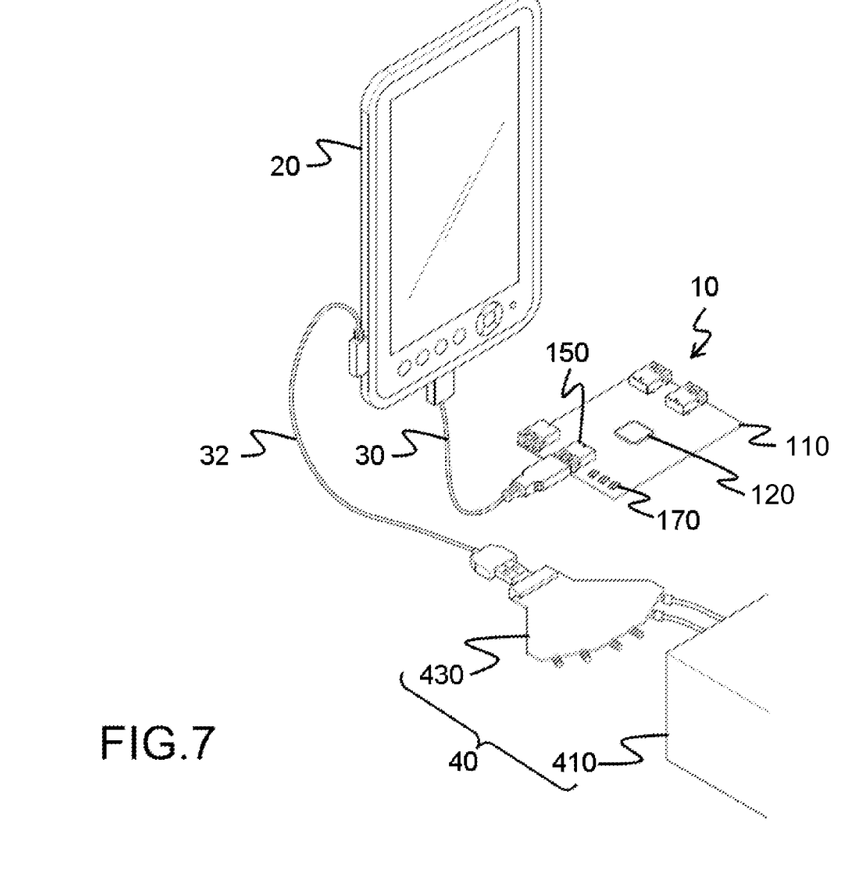
FIG. 7 is a schematic view of application of the testing fixture board in FIG. 6.
Figure 8:
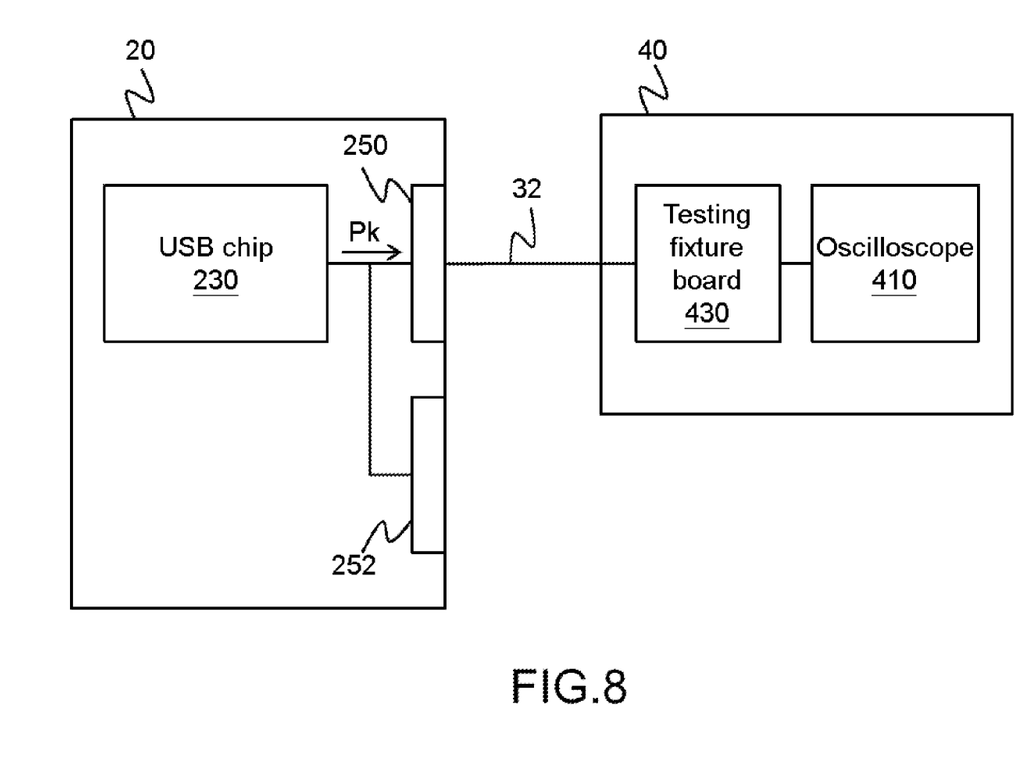
FIG. 8 is a schematic block diagram of the measuring device according to another embodiment of the present invention.
Figure 9:
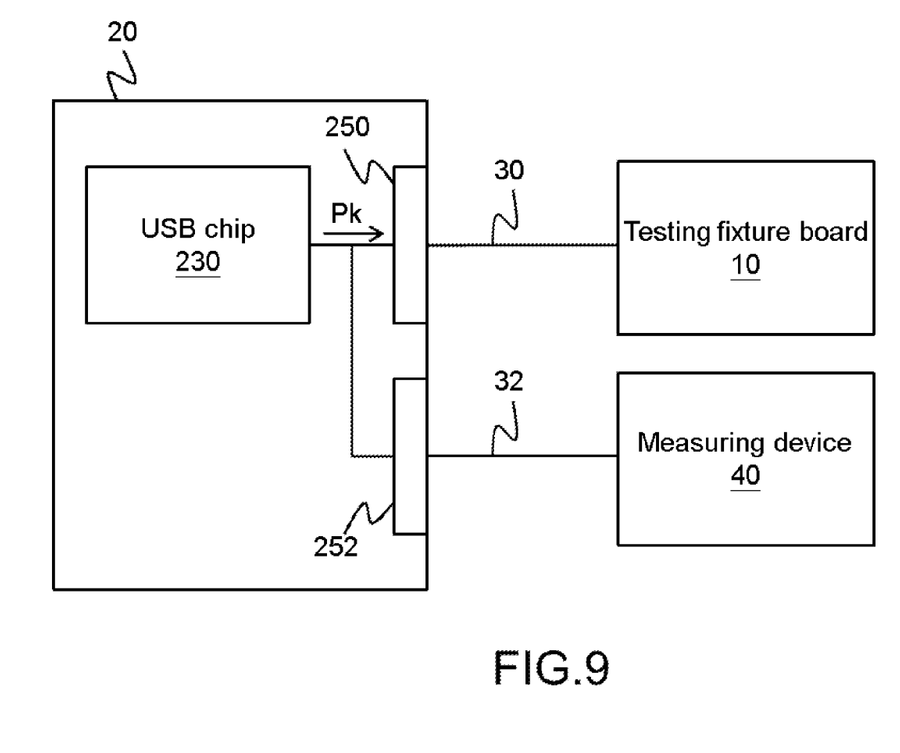
FIG. 9 is a schematic block diagram of the measuring device according to yet another embodiment of the present invention.

FIG. 6 is a schematic block diagram of another testing fixture board according to another embodiment of the present invention. FIG. 7 is a schematic view of application of the testing fixture board in FIG. 6. In another embodiment, the USB chip 230 of the USB device 20 is coupled to the external ports 250, 252, as shown in FIG. 6 and FIG. 7, respectively. The testing fixture board 10 and the measuring device 40 are each connected to the USB device 20 by the communication link via the external port 250, as shown in FIG. 8. Alternatively, the testing fixture board 10 and the measuring device 40 are connected to the USB device 20 by the communication link via the external ports 250, 252, respectively; for example, the testing fixture board 10 is coupled to the external port 250 of the USB device 20, whereas the external port 250 is coupled to the external port 252 of the USB device 20, as shown in FIG. 7 and FIG. 9.

In an embodiment, the external port 250/252 is a USB port or a circular mil-spec port. The USB port is a standard USB port, mini USB port, micro USB port, or type C USB port.

In an embodiment, the storage unit 130 and the control unit 190 are implemented by a microcontroller 120, as shown in FIG. 2 and FIG. 7. The microcontroller is, for example, a USB chip, but the present invention is not limited thereto. In an embodiment, a USB chip of the testing fixture board 10 is substantially identical to the USB chip 230 of the USB device 20. The USB chip 230 meets USB 3.0 standard.

In an embodiment, the measuring device 40 comprises an oscilloscope 410 (shown in FIG. 4, FIG. 5, FIG. 7 and FIG. 8,) and a measurement result shown on the oscilloscope 410 is a waveform diagram, such as an eye pattern. Therefore, the user observes a waveform, an operating voltage, and/or the other signal features in the waveform diagram to evaluate the compatibility and signal quality of the USB interface. In an embodiment, the measuring device 40 further comprises another testing fixture board 430 (shown in FIG. 4, FIG. 5, FIG. 7 and FIG. 8,) and the testing fixture board 430 is coupled between the USB device 20 and the oscilloscope 410. The testing fixture board 430 is conducive to signal transmission between the USB device 20 and the oscilloscope 410, for example, by sending the testing packets to the oscilloscope 410.

In an embodiment, the measuring device 40 is built-in with various standard templates for the test modes. The measuring device 40 compares a received testing packet with a standard template for the selected test mode to determine whether the USB testing carried out in the selected test mode is satisfactory (it will be determined to be satisfactory, provided that the received testing packet matches the standard template.) In an embodiment, the measuring device 40 uses its user interface to identify an ongoing test mode according to the user's input, read a standard template for the selected test mode, and compare the standard template with the received testing packet. In another embodiment, the measuring device 40 compares the received testing packets with all the built-in standard templates one by one to determine whether each testing packet matches any one of the standard templates. If the testing packet matches one of the standard templates, the measuring device 40 will determine that the USB testing carried out in the selected test mode is satisfactory. If the testing packet matches none of the standard templates, the measuring device 40 will determine that the USB testing carried out in the selected test mode is unsatisfactory.

In an embodiment, to carry out the USB testing in another test mode, the user controls the user interface 170 anew in order to select a desired test mode, causing the testing fixture board 10 to generate and send another test-triggering instruction to the USB device 20. Afterward, the USB device 20 generates and sends repeatedly another testing packet according to the newly-received test-triggering instruction, that is, following steps S01~S06 again.

In an embodiment, the USB device 20 is a host or an OTG (on-to-go) device and is exemplified by a mouse, keyboard, printer, fax machine, photocopier, hard disk drive, USB flash drive, camera, cellular phone, tablet, laptop, personal computer, set-top box, or game console.

In conclusion, a USB testing method and a testing fixture board for a USB device provided according to the present invention are applicable to a USB device operated by an embedded operating system with a view to triggering the USB device to test a USB interface thereof, thereby testing the compatibility and signal quality of the USB interface easily.

What is claimed is:

1. A USB testing method, comprising the steps of:
   selecting a first selected test mode from a plurality of test modes;
   creating a USB communication link between a USB device and a testing fixture board;
   generating, by the testing fixture board, a first test-triggering instruction corresponding to the first selected test mode according to the first selected test mode;
   sending the first test-triggering instruction to the USB device with the USB communication link;
   generating, by the USB device, a first testing packet corresponding to the first selected test mode according to the first test-triggering instruction; outputting the first testing packet repeatedly from at least one external port of the USB device;
   changing the first selected test mode to a second selected test mode in the plurality of test modes;
   severing the USB communication link and creating the USB communication link anew;
   generating, by the testing fixture board, a second test-triggering instruction corresponding to the second selected test mode according to the second selected test mode;
   sending the second test-triggering instruction to the USB device with the USB communication link;
   generating, by the USB device, a second testing packet corresponding to the second selected test mode according to the second test-triggering instruction; and
   outputting the second testing packet repeatedly from the at least one external port of the USB device.

2. The USB testing method of claim 1, wherein the USB communication link is created with one of the at least one external port.

3. The USB testing method of claim 1, wherein the testing fixture board stores a list of test-triggering instructions corresponding to the plurality of test modes, respectively, and the step of generating, by the testing fixture board, the first test-triggering instruction corresponding to the first selected test mode according to the first selected test mode comprises generating, by the testing fixture board, the first test-triggering instruction according to the first selected test mode and the list.

4. The USB testing method of claim 1, further comprising:
   coupling a measuring device to one of the at least one external port;
   receiving by the measuring device the first testing packet through the external port; and
   displaying on the measuring device a measurement result corresponding to the first testing packet.

5. The USB testing method of claim 4, wherein the measuring device comprises an oscilloscope, and the measurement result is a waveform diagram.

6. The USB testing method of claim 1, wherein the first test-triggering instruction is an identifier.

7. The USB testing method of claim 1, wherein the USB device is an embedded device.

8. The USB testing method of claim 1, wherein the at least one external port comprises at least one USB port.

9. The USB testing method of claim 8, wherein the at least one external port further comprises at least one circular mil-spec port.

10. A testing fixture board for a USB device, comprising:
    a substrate;
    a storage unit disposed on the substrate and adapted to store a list of selection signals and test-triggering instructions corresponding to a plurality of test modes;
    a USB port disposed on the substrate;
    a user interface disposed on the substrate and adapted to generate a first selection signal indicative of a first selected test mode among the plurality of test modes; and
    a control unit disposed on the substrate and coupled to the storage unit, the USB port and the user interface to generate a first test-triggering instruction corresponding to the first selected test mode according to the first selection signal and the list and send the first test-triggering instruction from the USB port;
    wherein the user interface is further adapted to generate a second selection signal indicative of a second selected test mode among the plurality of test modes; and
    the control unit is further adapted to generate a second test-triggering instruction corresponding to the second selected test mode according to the second selection signal and the list and send the second test-triggering instruction to the USB device.

11. The testing fixture board of claim 10, wherein the user interface is a switch module operating in a plurality of switch states indicative of the plurality of test modes, respectively.

12. The testing fixture board of claim 10, wherein the first test-triggering instruction is an identifier.

13. The testing fixture board of claim 10, wherein the storage unit and the control unit are implemented by a microcontroller.

14. A USB testing method, comprising the steps of:
selecting a selected test mode from a plurality of test modes;
creating a USB communication link between a USB device and a testing fixture board;
generating, by the testing fixture board, a test-triggering instruction corresponding to the selected test mode according to the selected test mode;
sending the test-triggering instruction to the USB device with the USB communication link;
generating, by the USB device, a testing packet corresponding to the selected test mode according to the test-triggering instruction; and
outputting the testing packet repeatedly from at least one external port of the USB device;
wherein the at least one external port comprises at least one USB port, and further comprises at least one circular mil-spec port.

* * * * *